H. W. SAVAGE.
HYDRAULIC DISINTEGRATING APPARATUS.
APPLICATION FILED AUG. 19, 1915.
1,172,634. Patented Feb. 22, 1916.
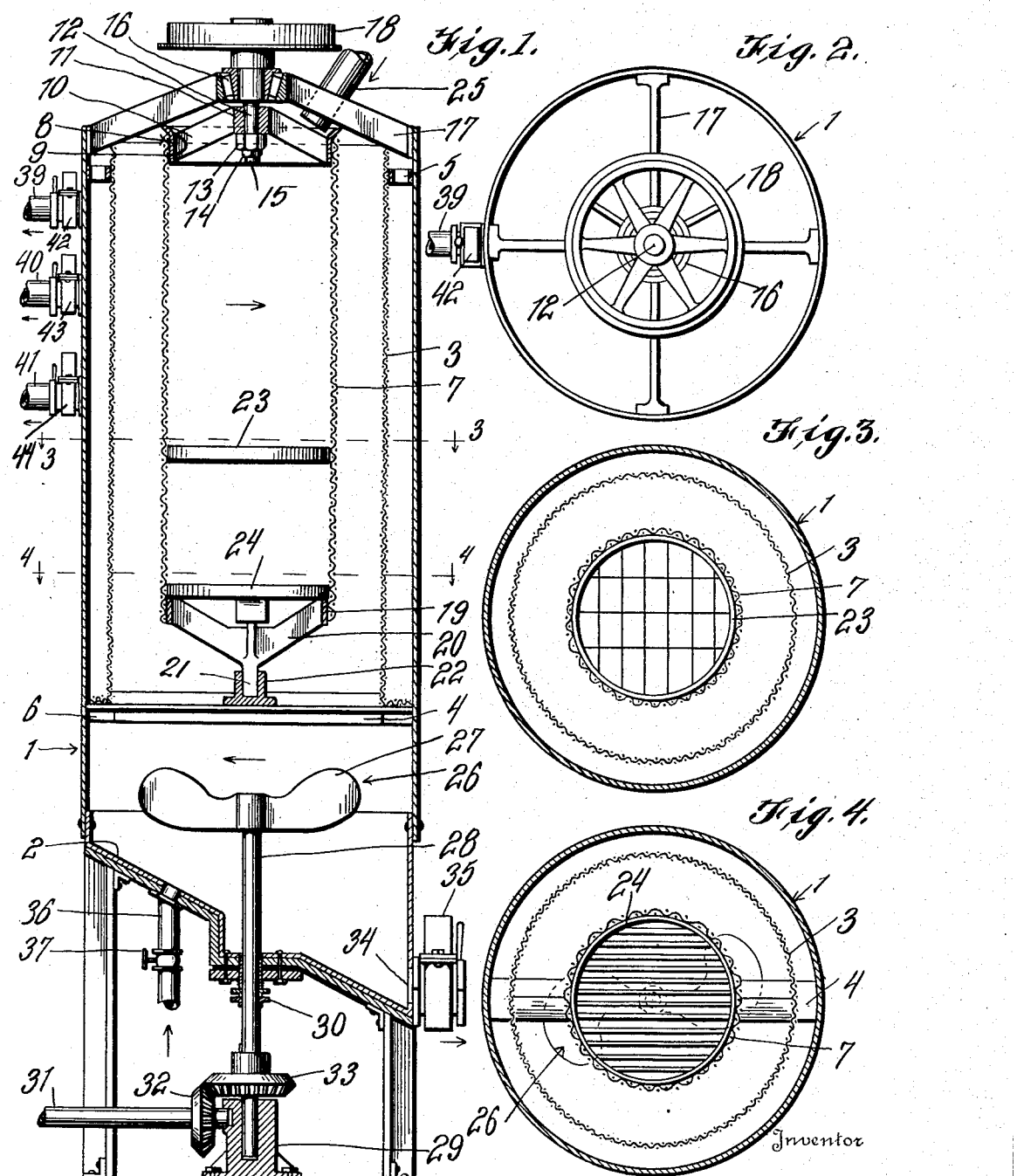
Herbert W. Savage

UNITED STATES PATENT OFFICE.

HERBERT W. SAVAGE, OF CAMBRIDGE, MASSACHUSETTS.

HYDRAULIC DISINTEGRATING APPARATUS.

1,172,634.  Specification of Letters Patent.  Patented Feb. 22, 1916.

Application filed August 19, 1915. Serial No. 46,247.

*To all whom it may concern:*

Be it known that I, HERBERT W. SAVAGE, a citizen of the United States, residing at Cambridge, in the county of Middlesex and State of Massachusetts, have invented certain new and useful Improvements in Hydraulic Disintegrating Apparatus, of which the following is a specification.

This invention relates to hydraulic disintegrating apparatus and particularly to apparatus adapted to effect the subdivision of materials, such as fullers' earth and kaolin which either in their natural conditions or upon being dried, are caused to disintegrate by the action of water thereon.

An important object of my invention is to provide means in which masses of material of the character referred to can be readily, effectively and economically transformed into grains, granules or similar small particles.

A further object of the invention is to provide means in apparatus of the character referred to, whereby grains, granules, or other small particles of a desired or predetermined size may be obtained.

Other objects and advantages of my invention will be apparent during the course of the following description.

In the drawings wherein for purposes of illustration I have shown a preferred embodiment of my apparatus, Figure 1 is a central vertical section of apparatus embodying my invention, Fig. 2 is a plan view of the apparatus, Fig. 3 is a cross section on line 3—3 of Fig. 1, and, Fig. 4 is a cross section on line 4—4 of Fig. 1.

Referring to the drawings, the numeral 1 designates a vertically disposed preferably cylindrical tank open at the top and provided with an inclined bottom 2.

Disposed within the tank 1 is a preferably cylindrical foraminous partition 3 which may advantageously be made of screen of any desired mesh, preferably of relatively fine mesh such as a 20 or 40 mesh screen. The partition 3 may be advantageously mounted upon the transverse supporting rod or bar 4, the upper and lower ends of the partition being spaced away from the side of the tank 1 by means of annular spacing rings 5 and 6, respectively.

Within the partition 3 is a sieve-drum 7 of foraminous material of a coarser mesh than the screen employed in the partition 3, preferably of 10 or 16 mesh screen. The circumferential portion of the drum 7 is supported at its upper end by a ring 8 having an inclined outwardly extending flange 9. The ring 8 is secured to the outer end of spokes or spider arms 10 carried by the hub 11 suitably mounted upon the vertically disposed shaft 12, as by means of the nut 13 and lock nut 14, engaging the screw-threaded lower portion 15 of the shaft 12.

The shaft 12 is mounted in bearings 16 supported at the inner ends of radially disposed spider arms 17, bolted or otherwise secured to the tank 1 and is provided with a pulley 18, which is adapted to receive power from a belt, not shown. The lower end of the circumferential portion of the sieve-drum 7 is secured to a supporting ring 19, carried at the outer end of the upwardly inclined spokes or spider arms 20 extending outwardly from the shaft 21, mounted within the step bearings 22, carried by the supporting cross bar 4. Disposed within and extending transversely across the sieve-drum 7, preferably slightly below the longitudinal center thereof, is a coarse supporting grate 23 and below this and preferably at the lower end of the sieve-drum 7 is a finer supporting grate 24.

A large inlet pipe or chute 25 is supported at the upper portion of the tank 1, discharging into the sieve-drum 7, the flange 9 of the ring 8 extending upwardly beyond the lower portion of such pipe or chute.

Disposed below the sieve-drum 7 is a liquid agitator 26 having screw impeller blades 27 suitably secured to the upper end of the shaft 28, supported at its lower end in a step bearing 29 and extending through the inclined bottom 2 of the tank 1, being provided with a stuffing box 30 when it passes therethrough. The shaft 28 receives its motion from the shaft 31, through beveled gears 32 and 33, as shown. Extending through the side of the tank 1 at its lowermost portion is a relatively large outlet pipe 34, controlled by a gate valve 35, through which lumps or particles of rock, sand, mica or like refuse may be withdrawn from the apparatus. Extending through the inclined bottom 2 of the tank 1, is an inlet pipe 36 controlled by the globe valve 37, through which water in any desired regulated quantity is caused to enter the tank 1. At the side of tank 1 are provided a plurality of outlet pipes 39, 40 and 41, controlled by suitable gate valves, 42, 43, and 44, respectively, through any desired one of which water carrying in suspension the grains or granules of the mass to be disintegrated, may be withdrawn from the tank 1.

In the use of the apparatus illustrated, lumps of fullers' earth, kaolin or other material to be disintegrated are fed through the pipe or chute 25 into the sieve-drum 7 which is caused to revolve at any desired speed. The material falls upon the coarse supporting grate 23 and while revolving thereon, is subjected to the action of water entering the tank 2 and maintained at the level therein, of the outlet pipe 39, 40, or 41 which is open. The action of the water upon the lumps will cause them to disintegrate or "slake" and the disintegrated particles suspended in water, pass out through the selective outlet pipe which is open. Materials of the character referred to usually contain rock, sand, mica, or the like, which it is desired to wholly separate from the disintegrated material, and lumps or particles of this refuse fall first through the coarse grate 23, then through the finer grate 24, into the bottom of the tank 1, from which may be withdrawn through the pipe 34. In the use of my apparatus these refuse particles or lumps are substantially wholly freed from the material to be disintegrated and collected.

In the treatment of fullers' earth and kaolin by means of my apparatus, I am able to regulate the size of the grains, granules or particles to be obtained by withdrawing the liquid carrying such grains in suspension at a selected water level and also by regulating the velocity of the water passing into and out of the tank 1. The higher the level at which the liquid containing the particles is drawn off and the slower the velocity of the current of water passing into and out of the tank 1, the finer the grains, granules or particles of the subdivided material will be.

The finely divided material suspended in the water passing out of the tank 1 is separated from the water by settling or otherwise.

In the use of my apparatus in the treatment of fullers' earth, I have found that the resulting grains or granules will not impart any odor or taste to oils treated therewith, whereas it is well known that dried and ground fullers' earth will impart a noticeable taste and odor to oils treated with it.

While I have shown and described the preferred form of my apparatus, it is to be understood that various changes in the arrangement, proportions of parts and details of construction may be made within the scope of my invention and without departure from scope of the subjoined claims.

Having described my invention, I claim:—

1. In apparatus of the character described, a tank having vertically spaced outlet devices, a stationary foraminous casing arranged within the tank in spaced relation thereto, a rotatable drum having its periphery formed of foraminous material and disposed within the stationary foraminous casing, a plurality of foraminous supports arranged within the drum for rotation therewith, and means to rotate the drum.

2. In apparatus of the character described, a tank having vertically spaced outlet devices, a stationary foraminous casing arranged within the tank in spaced relation thereto, a rotatable drum having its periphery formed of foraminous material and disposed within the stationary foraminous casing, a plurality of foraminous supports of different grades arranged within the drum for rotation therewith, and a propeller arranged within the tank beneath the drum for agitating the water.

3. In apparatus of the character described, a tank, means to supply water thereto, a sieve-drum rotatably mounted in said tank, means to rotate the sieve-drum, means to supply the material to be disintegrated to said sieve-drum, a foraminous partition surrounding the said drum formed of a sieve or screen of finer mesh than that of the sieve-drum, means to agitate the water in the tank and a plurality of valved outlet openings arranged at different vertical heights and through any desired one of which water containing particles of the material in suspension may be drawn off.

4. In apparatus of the character described, a tank having vertically spaced outlet devices, a foraminous casing arranged within the tank and spaced therefrom and covering the outlet devices, a rotatable drum mounted within the foraminous casing and formed of foraminous material, means to rotate the drum, foraminous supporting means carried by the drum to hold material therein, means to introduce water into the tank, and a propeller arranged within the tank beneath the drum to agitate the water therein.

5. In apparatus of the character described, a tank having vertically spaced outlet devices, a foraminous casing arranged within the tank in spaced relation thereto, a rotatable drum having its periphery formed of foraminous material and disposed within the foraminous casing, means to supply material to be treated to the upper end of the rotatable drum, a water inlet for the tank, arranged in the bottom of the tank and below the drum, means to agitate the water, and means to rotate the drum.

6. In apparatus of the character described, a substantially vertical tank, a substantially vertically arranged foraminous casing disposed within the tank, a substantially vertical rotatable drum having its periphery formed of foraminous material and disposed within the foraminous casing, means to supply material into the upper end of the drum, means to supply water into the lower end of the tank beneath the drum, and water agitating means disposed in the tank beneath the drum.

7. In apparatus of the character described, a tank having vertically spaced outlet devices, a foraminous casing arranged within the tank in spaced relation thereto, a rotatable drum having its periphery formed of foraminous material and disposed within the foraminous casing, and means to rotate the drum.

In testimony whereof I affix my signature in presence of two witnesses.

HERBERT W. SAVAGE.

Witnesses:
ARTHUR L. BRYANT,
C. L. PARKER.

Copies of this patent may be obtained for five cents each, by addressing the "Commissioner of Patents, Washington, D. C."